Sept. 27, 1932.  R. L. BRUCK  1,879,063
TIRE BUILDING FORM OR CORE
Filed Jan. 9, 1930
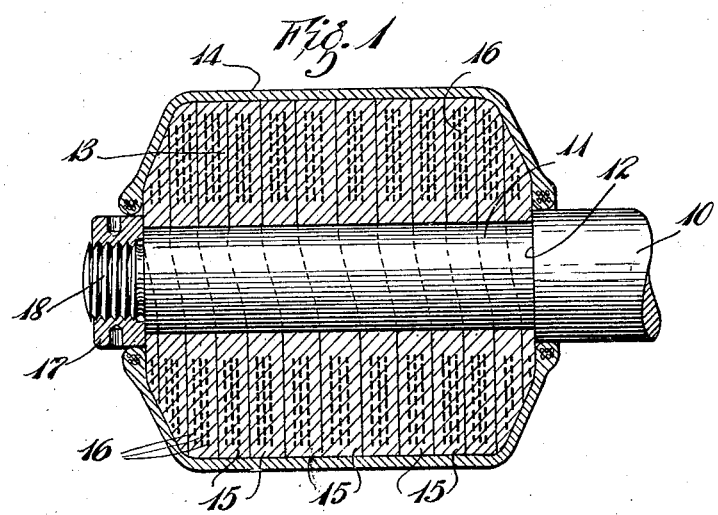
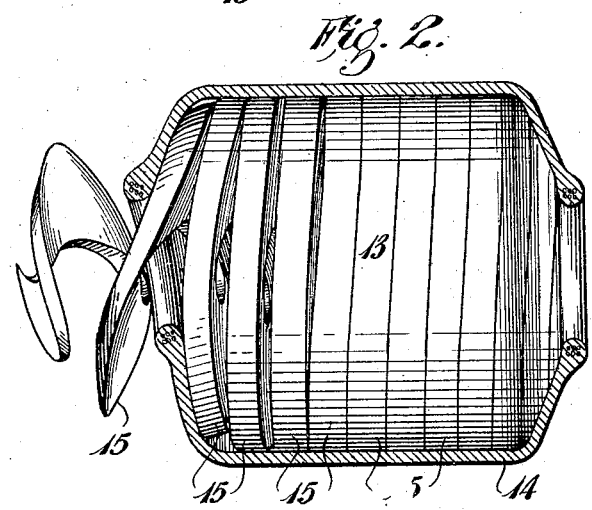
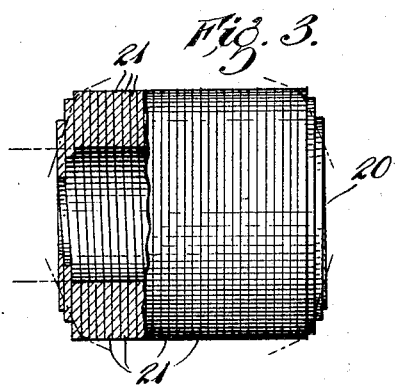
Inventor
Robert L. Bruck
By Eakin & Avery
Attys.

Patented Sept. 27, 1932

1,879,063

UNITED STATES PATENT OFFICE

ROBERT L. BRUCK, OF CUYAHOGA FALLS, OHIO, ASSIGNOR TO THE B. F. GOODRICH COMPANY, OF NEW YORK, N. Y., A CORPORATION OF NEW YORK

TIRE BUILDING FORM OR CORE

Application filed January 9, 1930. Serial No. 419,591.

This invention relates to tire-building forms or cores such as are used for supporting pneumatic tire casings during the fabrication thereof, and more especially it relates to forms for the building of pneumatic tire casings of relatively small bead diameter as compared with tread diameter, such that the use of ordinary forms or cores is precluded because of the difficulty of their removal from the completed tires.

The chief object of this invention is to provide a tire-building form which is easily removable from a tire having relatively small bead diameter. Another object is to provide a form of the character mentioned which may be quickly restored to normal shape and condition after its removal from the tire. Other objects will be manifest.

Of the accompanying drawing:

Fig. 1 is a longitudinal section through the preferred embodiment of my improved tire-building form, and a completed tire thereon.

Fig. 2 is a side elevation of my improved form illustrating the manner of its removal from a tire, the latter being in section.

Fig. 3 is a side elevation of a modified tire-building form, a part thereof being broken away and in section.

Referring to Fig. 1 of the drawing, 10 is the rotatable spindle of a tire-building machine (not shown), said spindle being formed with a reduced end portion 11 to provide a shoulder 12 thereon. Mounted upon the end portion 11 of the spindle 10 is a form or core 13 upon which tire casings, such as the tire casing 14, are built, said form comprising a series of helical, laterally-abutting convolutions 15, 15 of flexible or deformable and preferably resilient material. Said material preferably comprises rubber or similar material, and the convolutions thereof may be internally reinforced by longitudinally disposed strips of fabric 16, 16.

The individual convolutions 15 of the form 13 are rectangular in section, except at the ends of the form, so that the form, when in operative position upon the spindle-end 11, presents a compact, generally cylindrical, structure. A spanner-nut 17, preferably of the same diameter as the spindle 10, is threaded onto an axial extension 18 of the spindle-end 11 to retain the form 13 on the latter, and, for urging said form against the shoulder 12 with sufficient pressure to compact the form and to prevent relative angular movement of the form and spindle. The convolutions 15 adjacent the respective ends of the form 13 are somewhat thinner than the medial convolutions, to provide greater flexibility and thereby to facilitate the removal of the form from a tire.

The external contour of the form 13 is generally cylindrical, and its end portions are frusto-conical. A tire casing 14 built on the form has its bead portions disposed adjacent the nut 17 and the spindle 10 at the ends of the form and its tread portion upon the medial cylindrical portion of the form. The radial dimension of each convolution of the form is slightly less than the bead diameter of the tire so that the form may be removed from the tire through its central openings. Preferably the form is so proportioned that in a tire built thereon the cylindrical portion of the tire comprises that portion thereof which is outside of its neutral zone when the tire is subsequently distended to normal tire shape, and the frusto-conical end portions of the tire are disposed inside said neutral zone.

In the operation of the device, the form 13 is mounted and secured upon the spindle 10 as shown, and a tire 14 is built upon the form in the usual or desired manner. The nut 17 is then removed and the core with tire thereon removed from the spindle, after which the form is removed from the tire by withdrawing its convolutions endwise through either of the openings defined by the beads of the tire, as is clearly shown in Fig. 2.

The natural resilience of the material from which the convoluted form is constructed causes the convolutions thereof to resume substantially their original relative positions after they are withdrawn from the tire, which facilitates the re-mounting of the form for repetition of the operations described.

In the modification shown in Fig. 3 the form 20 comprises a plurality of laterally abutting helical convolutions 21, 21 of a strip of resilient metal such as spring steel, the strip being disposed with its greatest width in a radial direction. The drawing illustrates how the form is initially wound and the broken lines therein indicate where it is subsequently dressed down to give it the desired contour.

Other modifications may be resorted to within the scope of the appended claims.

I claim:

1. A tire-building form comprising a plurality of helical, laterally-abutting convolutions of resilient material, each of said convolutions being longitudinally disposed with relation to a tire built thereupon.

2. A tire-building form comprising a plurality of helical, laterally-abutting convolutions of a length of resilient material of substantially rectangular cross section, each of said convolutions being disposed longitudinally with relation to a tire built thereon.

3. A tire-building form comprising a plurality of helical convolutions of a strip of rubber, each of said convolutions being longitudinally disposed with relation to a tire built thereupon.

4. A tire-building form comprising a plurality of helical convolutions of a strip of rubber provided with longitudinal reinforcement in the strip.

5. A tire-building form comprising a plurality of helical convolutions of resilient material, the convolutions at the ends of the form having greater flexibility than the intermediate convolutions.

6. A tire-building form comprising a plurality of helical convolutions of resilient material, the medial convolutions of the form being greater in radial dimension than those at the ends thereof.

7. A tire-building form comprising a plurality of helical convolutions of resilient material, and means for holding said convolutions in laterally abutting relation.

8. A device of the character described comprising a rotatable support, a plurality of helical convolutions of resilient material thereon, and means on said support and movable axially thereof for urging said convolutions into laterally abutting relation.

9. A tire building form comprising a plurality of helical, laterally-abutting convolutions of flexible material, the axis of said helical convolutions extending in substantially the same direction as the rotational axis of a tire built thereupon.

In witness whereof I have hereunto set my hand this 6th day of January, 1930.

ROBERT L. BRUCK.